UNITED STATES PATENT OFFICE.

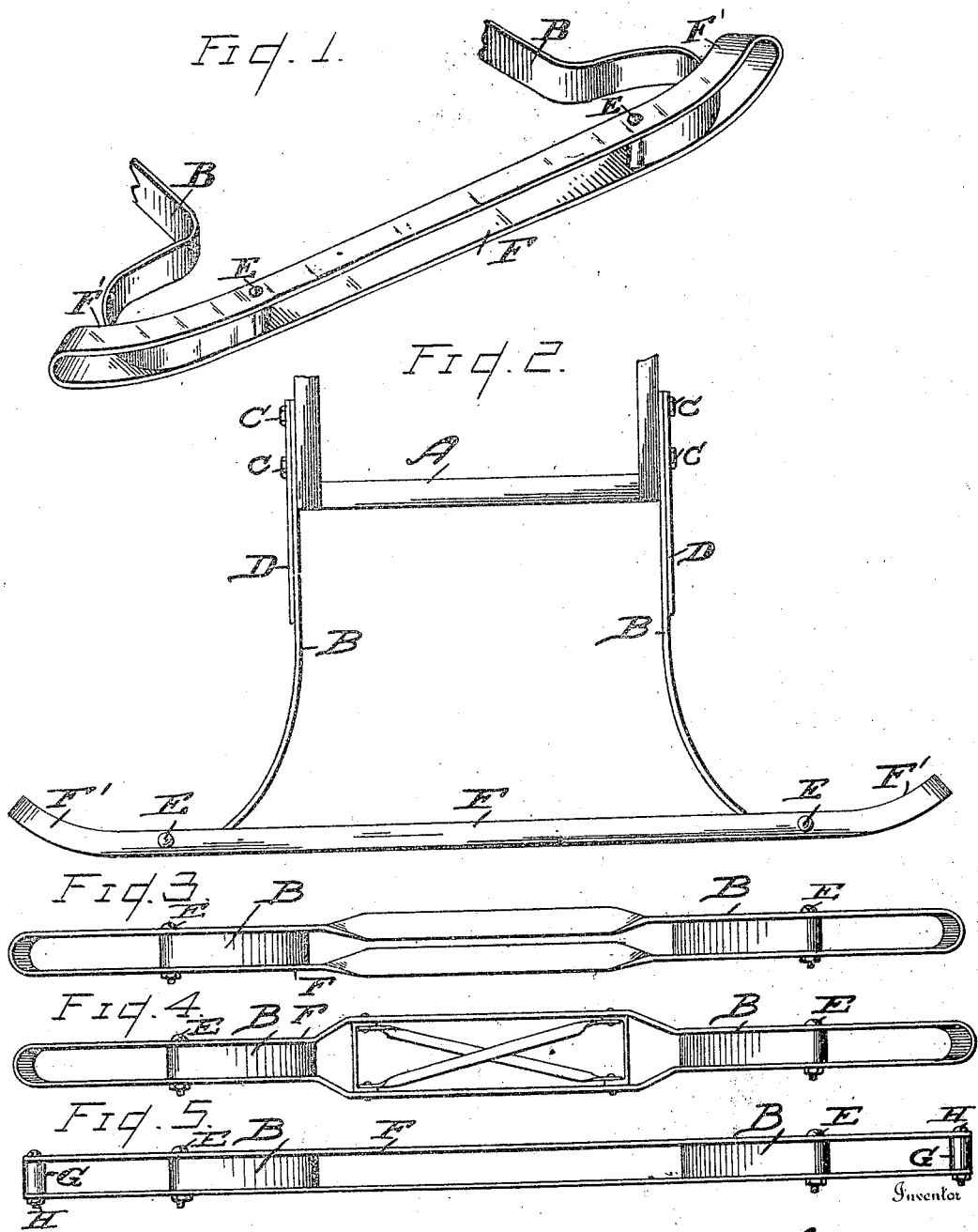

EDWARD F. LYON, OF DETROIT, MICHIGAN.

BUMPER FOR MOTOR-DRIVEN VEHICLES.

1,413,860. Specification of Letters Patent. Patented Apr. 25, 1922.

Application filed December 16, 1921. Serial No. 522,885.

*To all whom it may concern:*

Be it known that I, EDWARD F. LYON, citizen of the United States, residing at Detroit, county of Wayne, State of Michigan, have invented a certain new and useful Improvement in Bumpers for Motor-Driven Vehicles, and declare the following to be a full, clear, and exact description of the same, such as will enable others skilled in the art to which it pertains to make and use the same, reference being had to the accompanying drawings, which form a part of this specification.

My invention relates to an improvement in bumpers for motor driven vehicles shown in the accompanying drawings and more particularly described in the following specification and claims.

The object of my invention is to provide a simple and inexpensively constructed bumper with adequate resiliency and strength to resist the shock of accidental impact.

A further object of the invention is to provide a transverse impact bar which will afford sufficient strength to resist shocks but which is adapted to permit of entire freedom of movement of the springs connected with said bar and with the vehicle.

With the foregoing and other objects in view which will appear as the description proceeds the invention further resides in the combination and arrangement of parts and in the details of construction hereinafter described and claimed it being understood that changes may be made in the precise embodiment of the invention herein disclosed without departing from the spirit of the same.

In the drawings accompanying this specification:

Figure 1 is a perspective view of the impact bar and springs supporting the bar in position upon the frame of the vehicle.

Figure 2 is a plan view of the same showing a pair of supporting springs of somewhat different configuration attached to a fragmentary portion of a vehicle frame.

Figure 3 is a front elevation of a modification of the transverse bar with its central portion bent to provide two adjacent flat surfaces toward the front that a relatively broad surface may be presented to receive the shock of impact.

Figure 4 is another modification of the impact bar, its central portion being shaped to receive a panel bolted between the upper and lower horizontal members.

Figure 5 is another modification in which two flat members are coupled together at their ends by bolts extending through suitable spacing thimbles.

Referring now to the letters of reference placed upon the drawings:

A, denotes the frame of a motor vehicle, B, B, are resilient members secured to the side sills of the frame of the vehicle by bolts C which may also extend through plates D, D, overlapping the outer wall of the resilient members. Secured to the outer ends of the resilient members B by transverse bolts E, E, is an open loop-shaped impact bar F, the ends of which are preferably arc-shaped as indicated at F'. The impact bar F being in the form of an "open" loop it will be apparent that the resilient supporting members are free to pass through the impact bar when the latter is under the stress caused through impact with another object,—thus adding greatly to the resiliency of the device.

The modification shown in Figure 3 provides the central portion of the impact bar with two relatively broad impact bearing surfaces for contact with other bodies.

In Figure 4 a modification has been shown in which the loop has been widened to receive an insert panel between the spaced portions of the loop thereby stiffening the impact member without effecting the resiliency of its supporting members.

Another modification is shown in Figure 5 in which the loop member is made up of two flat bars spaced apart by sleeves or thimbles G, through which extend bolts H, H, to secure the parts together as a unit.

In Figure 1 a modified form of the resilient supporting members B is shown.

It will be apparent that in providing a horizontally disposed loop-shaped impact member the device may be constructed of relatively light material and still resist a great impact shock. Its "open" construction permits the maximum movement of the resilient members supporting the bar as the ends of the supporting members are free to oscillate through the loop-shaped member.

Having thus described my invention what I claim is

1. In a device of the character described, the combination of a loop-shaped impact member and a pair of resilient members pivotally bolted thereto between the spaced walls of said loop-shaped member and adapted to be secured to the frame of the vehicle, the forward portion of said resilient members being free to vibrate through the spaced walls of the loop-shaped impact member when resisting a shock received through contact with the latter.

2. In a device of the character described, the combination of a horizontal loop-shaped impact member and a pair of resilient members pivotally bolted to said horizontal loop-shaped impact member and secured to the frame of the vehicle, the forward portion of said resilient members being free to oscillate through the horizontal open loop of the impact member.

3. In a device of the character described, a horizontal loop-shaped impact member having its upper and lower portion bent whereby its horizontal walls are relatively farther apart than the ends of the loop-shaped member, a stiffening member secured between the expanded wall portion and a pair of arcuate-shaped springs pivotally bolted to said horizontal loop-shaped member adapted to be secured to the frame of a vehicle.

4. In a device of the character described, a horizontal loop-shaped impact member comprising an upper and lower plate spaced apart, in superimposed relation, and a pair of arcuate-shaped springs pivotally supported between the upper and lower members of the loop.

In testimony whereof, I sign this specification in the presence of two witnesses.

EDWARD F. LYON.

Witnesses:
S. E. THOMAS,
JOHN CONSIDINE.